United States Patent [19]

Uphoff

[11] 3,905,449

[45] Sept. 16, 1975

[54] SCAFFOLD ON ROLL-OVER FRAME ON A VEHICLE

[75] Inventor: Billie J. Uphoff, Morton, Ill.

[73] Assignee: Morton Buildings, Inc., Morton, Ill.

[22] Filed: Aug. 30, 1973

[21] Appl. No.: 392,881

[52] U.S. Cl. .............. 182/82; 182/113; 182/129; 280/150 C
[51] Int. Cl.² ............... E04G 1/24; B60R 27/00
[58] Field of Search ....... 182/127, 129, 63, 82, 113, 182/141, 152; 280/150 C; 296/102

[56] References Cited
UNITED STATES PATENTS

| | | | |
|---|---|---|---|
| 2,539,951 | 1/1951 | Hall | 296/102 |
| 2,698,673 | 1/1955 | Solomon | 182/63 |
| 3,556,249 | 1/1971 | Jackson | 182/63 |
| 3,584,897 | 6/1971 | Frantz | 280/150 C |
| 3,752,261 | 6/1971 | Bushnell | 182/141 |
| 3,804,435 | 4/1974 | See et al. | 280/150 C |

*Primary Examiner*—Reinaldo P. Machado
*Attorney, Agent, or Firm*—Hill, Gross, Simpson, Van Santen, Steadman, Chiara & Simpson

[57] ABSTRACT

A scaffold carried by the roll over frame on a vehicle required by law to have such frame, which scaffold is so arranged as to give a new function or operation to the vehicle and not interfere with the effectiveness of the roll over frame when the vehicle is operating in territory or for a purpose that may cause the vehicle to fall and possibly turn over.

6 Claims, 6 Drawing Figures

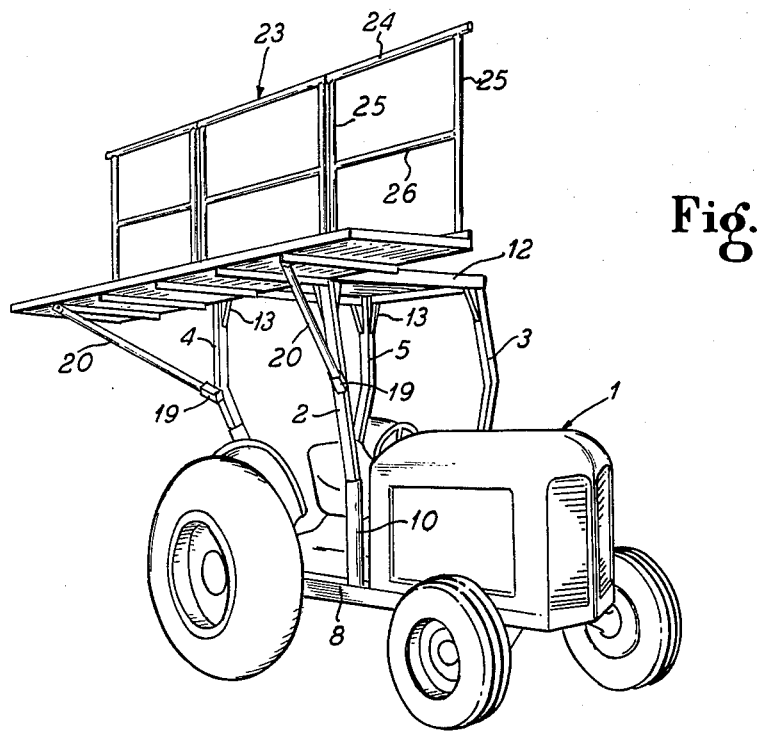
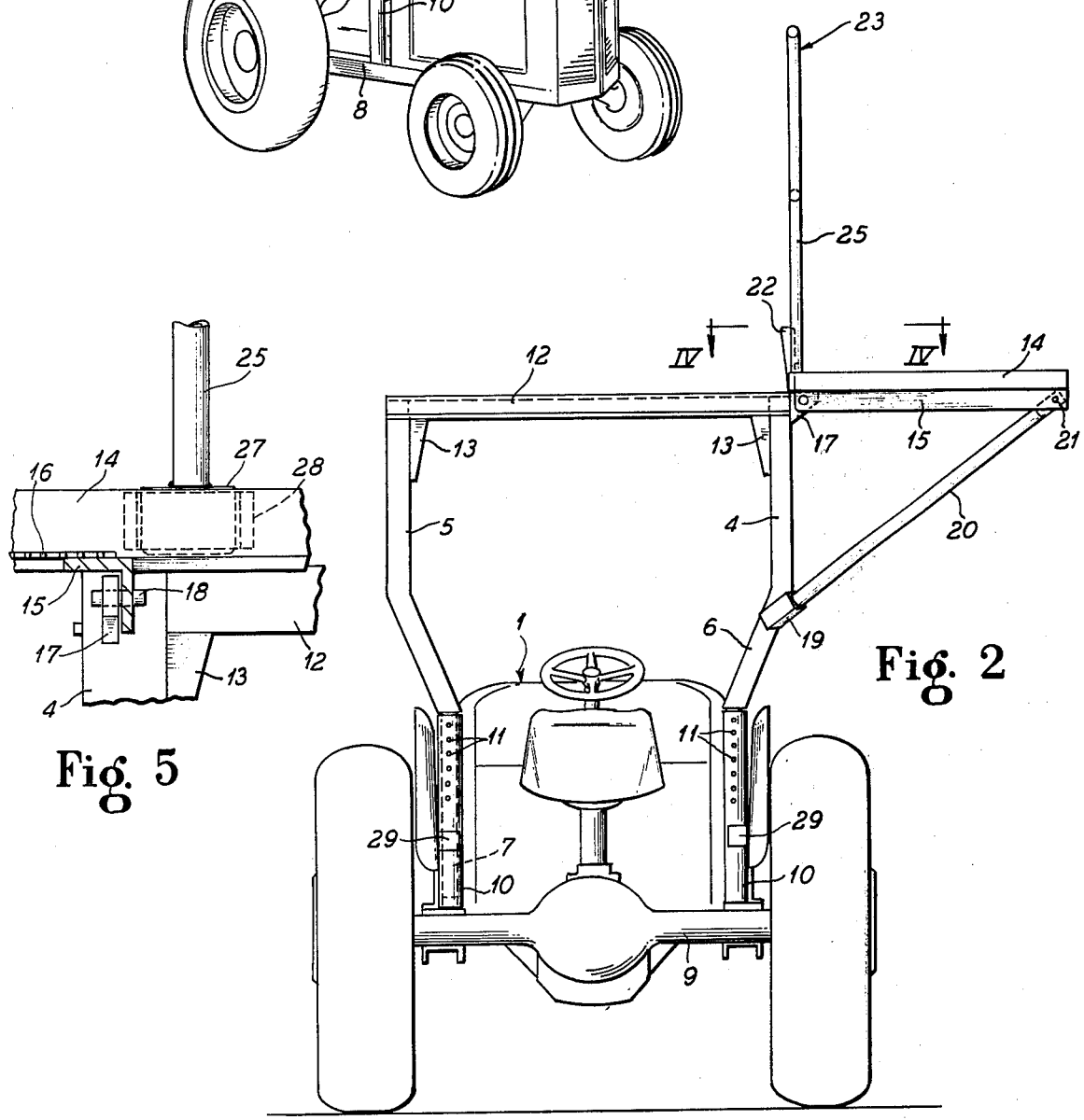

SCAFFOLD ON ROLL-OVER FRAME ON A VEHICLE

BRIEF SUMMARY OF THE INVENTION

Trucks and tractors of the type generally used on farms and for the erection of buildings are now required by law to include a roll over frame for the protection of the driver. Such trucks may be equipped at one or both ends with power driven mechanism for accomplishing various purposes such as lifting, earth elevating and moving equipment, power driven augers for digging post holes, bulldozer blades, and various other needs. Equipped with a roll over frame, which usually embodies a canopy for the protection of the driver against the elements, a truck merely had something else to carry; in other words, a dead load.

I have discovered that new uses for a truck regardless of the equipment at the front or back ends thereof may be provided by way of a superstructure, i.e. a scaffold, carried by the roll over frame. Such a superstructure is preferably foldable so as not to interfere with the effectiveness of the roll over frame when the truck is operating in locations and under conditions that might result in it turning over. However, where the truck may be operated on substantially level ground with little or no danger of ever turning over, the superstructure might be unfolded or set up and utilized for various purposes depending upon the structure or mechanism embodied in the superstructure. A superstructure need not of necessity be removed from the truck when it is performing other duties, but can be carried along one or both sides of the truck out of the way of the other mechanism and in a manner not to interfere with the effectiveness of the roll over frame.

Accordingly, it is an important object of the instant invention to provide a truck having a roll over frame with a superstructure carried by the roll over frame and of such a character as to add to the usefullness of the truck.

Accordingly, by way of example and not by way of limitation, I have herein set forth such a superstructure in the form of a scaffold which includes supporting members to hold the scaffold in position, a catwalk, and a guard railing made up of a plurality of sections. The catwalk frame is pivoted to the canopy of the roll over frame, the sections of guard railing may be removed from sockets connected to the catwalk frame and hung on hooks which become effective for that purpose when the catwalk is lowered to extend alongside the roll over frame. The supporting members are easily removable and also carried by part of the roll over frame when not in use. The catwalk extends to one side of the canopy so that the truck may be driven close to a building so that the catwalk is nearly touching the building on one side, making it easy for workmen to paint, repair, add parts to the building or perform other operations on the building. Obviously, there are a number of other uses for such an arrangement. It will also be noted that if desired, the roll over frame may be made with a height adjustment whereby to vary the height of the scaffold.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a perspective view of a truck having a roll over frame and a superstructure embodying principles of the instant invention connected and supported by the roll over frame in operative position;

FIG. 2 is an enlarged rear end view of the structure of FIG. 1;

FIG. 5 is a fragmentary vertical sectional view, enlarged, taken substantially as indicated by the line V—V of FIG. 4.

DETAILED DESCRIPTION

Figure 3:
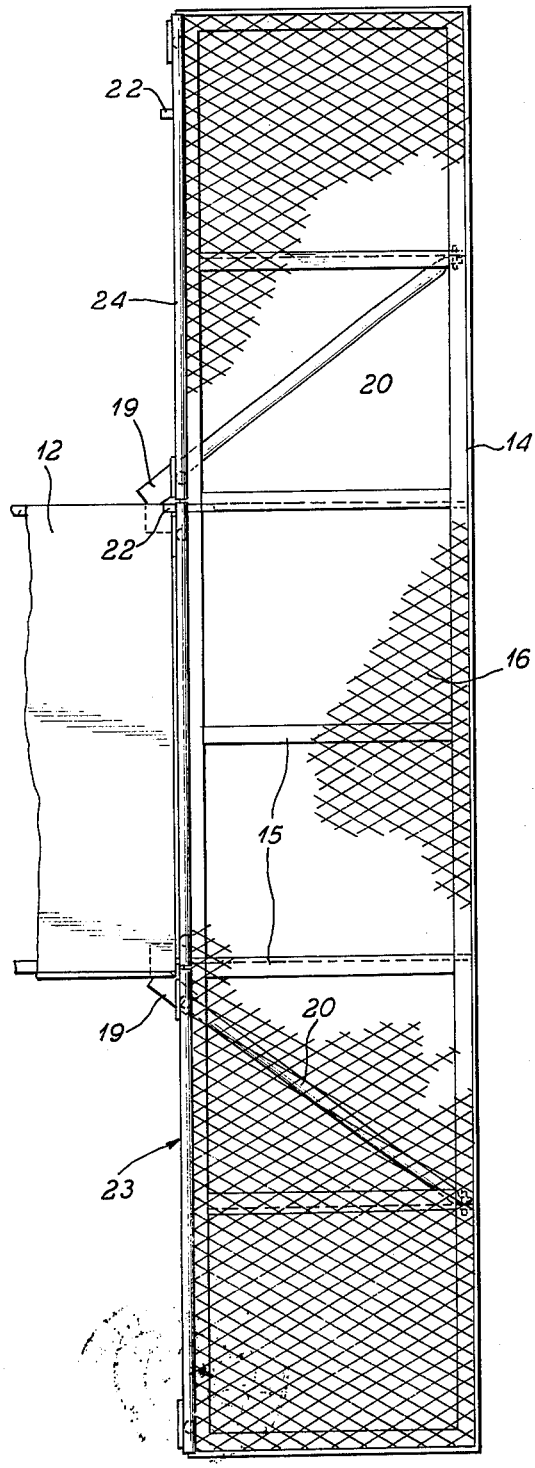
FIG. 3 is a fragmentary plan view of the scaffold as shown in FIG. 2.

The illustrated embodiment of the instant invention is shown associated with a truck, generally indicated by numeral 1, from which all mechanism normally carried by the front end or the rear end of the truck has been purposely omitted in order to facilitate illustrating the roll over frame and superstructure in a clear and distinct manner.

The roll over frame includes a pair of upright allochiral bars 2 and 3 and a similar pair of bars 4 and 5 rearwardly thereof. The spacing between the upper portions of each pair of bars is larger than the lower portion, each bar being stepped inwardly as indicated at 6, so that the lower portion 7 of a bar extends vertically downwardly immediately adjacent the body of the truck. The lower portion 7 of each of the upstanding bars may be welded or equivalently secured to the frame 8, rear axle housing 9, or any other suitable part of the truck 1. If so desired, however, a socket 10 may be secured to the truck to telescopically receive therein the lower portion 7 of each of the upstanding bars. In that event, the sockets are each provided with a series of diametrally opposed apertures 11 and the lower ends of the bars are provided with similar apertures. When these apertures are in alignment, the bars may be pinned or bolted to the socket at desired levels or increments of height. Secured to the upper ends of the bars is a canopy 12 welded or equivalently secured to the tops of the bars with ample corner bracing 13 also firmly attached to both the canopy and the respective bars. The canopy, of course, overhangs the driver and not only protects him against the elements, but also protects him should the vehicle perchance roll over. Such a roll over frame complies with the law requiring protection for the driver.

The superstructure, which in the illustrated instance is in the form of a scaffold, embodies a catwalk defined by a frame 14, which may satisfactorily be made of angle irons with one flange projecting upwardly above the other, and reinforced by cross members 15 welded or equivalently secured to the underside of the frame 14 and extending transversely thereof at spaced intervals. The tread for the catwalk may be made of heavy hardware cloth, heavy expanded metal, a grill, or any other suitable substance and formation, as indicated at 16. This tread may be secured to the horizontal portion of the angle bar frame 14.

The catwalk is preferably pivoted at one side on both the upstanding uprights 2 and 4 on the same side of the truck. As indicated best in FIG. 5, a lug 17 projects from each of the posts 2 and 4, and extends adjacent one of the cross members 15 of the catwalk, both the lug and flange of the cross member being apertured and pivoted by a pin 18 interconnecting said lug and flange, or in an equivalent manner. On each of the bars 2 and 4 a socket 19 is welded or equivalently secured to receive telescopically one end portion of a supporting rod 20, the other end of which is pivoted in a removable manner to the outer end from one of the cross members 15 as seen in FIGS. 2 and 3. The sockets 19 are disposed at an angle such that the supporting rods will each be at a substantially 45° angle to the vertical but at the same time, sloped toward the ends of the catwalk as clearly seen in FIG. 3. These rods maintain the catwalk in the horizontal useful position as seen in FIGS. 1, 2 and 3. When in useful position, the catwalk will be at substantially the level of the canopy 12 of the roll over frame. Along the inner side of the catwalk frame 14 a pair of spaced hangers 22—22 are secured to that frame, these hangers tapering toward the frame and when the catwalk is in useful position, the hangers project upwardly but when the catwalk is pivoted downwardly to the position seen in FIG. 6, the hangers project laterally outwardly, for a purpose that will later appear.

Figure 4:
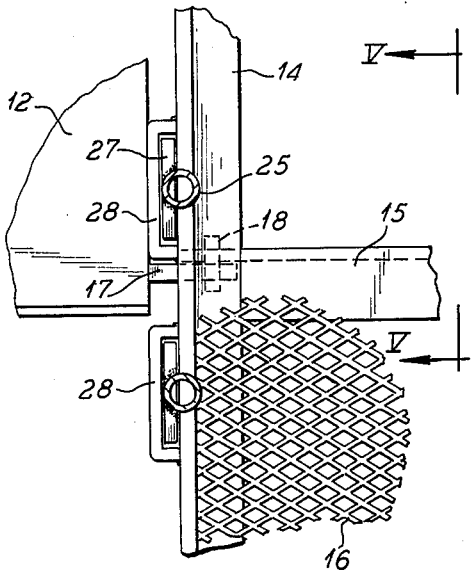
FIG. 4 is an enlarged fragmentary plan sectional view taken substantially as indicated by the line IV—IV of FIG. 2.

A safety guard railing, generally indicated by numeral 23, is along the inner or truck side of the catwalk. This guard railing is preferably sectionalized, and in the illustrated embodiment, it is shown made up of three sections connected in an upstanding position to the catwalk as seen in FIGS. 1 and 2 and which may be readily removed therefrom when the scaffold is not in use. Each section of the guard railing comprises a top rail 24 to which two upright legs 25—25 are connected, one adjacent each end thereof, and at least one intermediate reinforcing cross rail 26. As seen best in FIGS. 5 and 6, the lower end of each leg 25 is welded or equivalently secured to a polygonal anchor block 27, which in the illustrated instance, is rectangular. A socket, in the form of a stirrup 28 shaped in accordance with the shape of the anchor block receives the same as best seen in FIG. 4. The leg 25 overlies the upstanding rail of the catwalk frame 14 and so prevents the anchor block 27 from entering the stirrup too far. This arrangement affords a solid anchorage for the guard railing assembly, and permits easily separating the guard rail sections from the catwalk frame.

It will be noted that when the scaffold is in operating position, the catwalk projects laterally to one side of the roll over frame, whereby it is a simple expedient to drive the truck so that the catwalk is immediately adjacent a building wall, for example, and enables the operator or operators to work on the building wall for substantially any purpose, such as painting, repairing, adding parts, or doing masonry work, etc.

Figure 6:
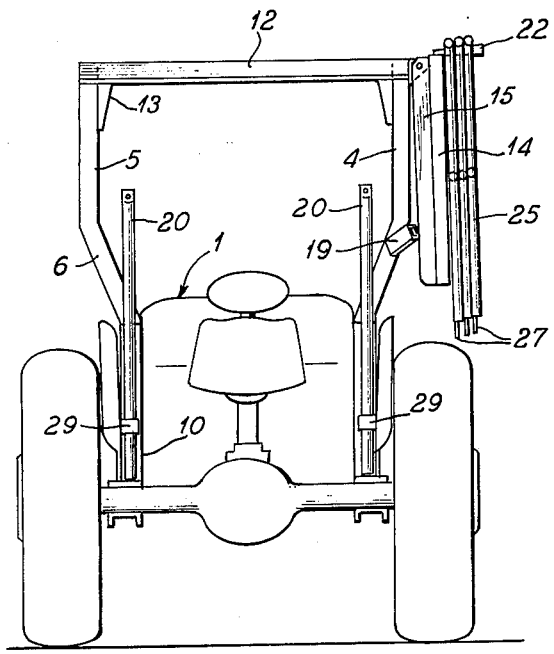
FIG. 6 is a rear end view of the structure of FIGS. 1 and 2 showing how the scaffold is carried by the roll over frame in take-down position.

When it is desired to use the truck for other purposes, where there is a possibility of the truck turning over, it is a simple expedient to dismantle the superstructure. This is accomplished by simply raising the sections of the guard railing 23 until the anchor plates 27 are disengaged from the stirrups 28; disconnect the brace rods 20 from the pivot connections 21, pull the brace rods out of their respective sockets 19, and stand the brace rods in the position seen in FIG. 6 with the lower portions thereof engaged in stirrups 29—29 welded or equivalently secured to the sockets 10—10 for the lower portions of the roll frame bars 4 and 5. If the sockets for adjusting the height of the roll over frame are not utilized, the stirrups 29-29 would be welded directly to the lower portions of the roll over frame bars. When the brace rods 20 are removed, the catwalk may pivot downwardly from the position seen in FIG. 2 to the position seen in FIG. 6, hanging alongside the roll over frame. The downward pivoting of the catwalk brings the hangers 22 into lateral position and the sections of the guard railing 23 may be hung on these hangers as indicated in FIG. 6, and the tapered shape of the hangers urges the guard railing sections inwardly toward the roll over frame on the truck. Any suitable tie means may be utilized to keep the guard railing sections and catwalk from swinging or rattling during the use of the truck. It will, therefore, be seen that the entire superstructure is carried by the roll over frame when in useful position and when dismantled and not in use, there being no need to remove the structure entirely from the roll over frame because when dismantled and arranged as seen in FIG. 6, it will not interfere with the function of the roll over frame.

The entire structure is economical, easily assembled for use or dismantled for non-use and provides a very efficient addition to the purposes for which the truck may be used. Obviously, the superstructure illustrated by way of example, could be mounted on the opposite side of the roll over frame if so desired. If the roll over frame is height-adjustable, the superstructure also may be varied selectively in height.

I claim as my invention:

1. A motor driven vehicle of the type capable of being driven for off the road travel and requiring a roll over frame for driver protection, wherein the improvement comprises a superstructure carried by said roll over frame adjustable for operation when the vehicle travels over relatively smooth ground to add another use to the vehicle and wherein said superstructure may be dismantled and carried by said roll over frame in such location as to leave the top of the roll over frame clear and free when the vehicle travels under conditions that could possibly result in the vehicle turning over, said superstructure being a scaffold, said roll over frame including a plurality of upstanding bars connected at their upper ends by a canopy, and said scaffold including a catwalk pivoted at one side of said roll over frame to a pair of said bars adjacent said canopy, a guard railing removably mounted on said catwalk along one side thereof, and removable brace means to hold said catwalk in horizontal position.

2. The vehicle of claim 1, including a pair of spaced hangers connected to the side edge of said catwalk in position to extend horizontally when said catwalk is lowered by removal of said brace means to hang vertically alongside said roll over frame, whereby said guard railing may be suspended on said hangers beside said catwalk when said superstructure is adjusted for non-usage.

3. The vehicle of claim 1, wherein said guard railing is in like sections, each section including cross members and vertical legs, polygonal anchor members on the lower ends of said vertical legs, and a similarly shaped socket member on said catwalk to receive each said guard member.

4. The vehicle of claim 2, wherein said guard railing is in a plurality of sections all of which may be hung on said hangers in overlapping relationship, and said hangers being tapered in a manner to urge said sections toward said catwalk.

5. A motor drive vehicle of the type capable of being driven for off the road travel and having a roll over frame for driver protection, wherein the improvement comprises:
   a scaffold carried by said roll over frame;
   means connecting said scaffold to the frame for operation when the vehicle travels over relatively smooth ground to add another use to the vehicle;
   said connecting means permitting the scaffold to be shifted from a setup position in which the scaffold extends above the top of said frame into a position where the scaffold is carried by said roll over frame in a location at one side and below the top of the roll over frame so as to leave said top clear and free when the vehicle travels under conditions that could possibly result in the vehicle turning over.

6. The vehicle of claim 1, wherein means are provided elsewhere on said vehicle to carry said brace means in a relatively safe location against damage by a roll over of the vehicle.

* * * * *